United States Patent [19]

Davidson

[11] Patent Number: 4,914,947
[45] Date of Patent: Apr. 10, 1990

[54] SAMPLING PROBE FLOW SENSOR

[75] Inventor: Robert M. Davidson, Freeport, Ill.

[73] Assignee: Honeywell Inc., Minneapolis, Minn.

[21] Appl. No.: 252,230

[22] Filed: Sep. 30, 1988

[51] Int. Cl.$^4$ .............................................. G01F 1/68
[52] U.S. Cl. .................................. 73/202.5; 73/863.61
[58] Field of Search .................. 73/202, 202.5, 204.21, 73/204.22, 863.61, 118.2

[56] References Cited

U.S. PATENT DOCUMENTS 4,215,565  8/1980  Zanker ................................ 73/202.5
4,457,169  7/1984  Tauzerbach et al. ............... 73/202.5

Primary Examiner—Herbert Goldstein
Attorney, Agent, or Firm—Charles L. Rubow

[57] ABSTRACT

A mass air flow sensor having a probe body defining a first arcuate passageway connecting a flow entrance opening aligned with an axis and a flow exit opening offset from the axis so that contaminants suspended in fluid flowing through the first passageway are driven by centrifugal force toward the outer wall thereof. A second passageway is connected to a sampling port in the inner wall of the first passageway, and has located therein a flow detector of the type having a thin film heater and at least one thin film heat sensor spaced from the heater along the direction of flow.

13 Claims, 2 Drawing Sheets

SAMPLING PROBE FLOW SENSOR

BACKGROUND OF THE INVENTION

The invention disclosed herein relates generally to flow sensing apparatus, and more particularly to a method and probe design for shielding a fragile flow sensor from contaminants in the flow being sensed while maintaining desirable sensing performance characteristics.

Recent advancements in micro machining techniques have led to the development of solid state flow sensors of a type having a thin film heater and at least one thin film heat sensor suspended over a depression etched in a silicon substrate. Such sensors, referred to as microbridge flow sensors, are mass producible, very small and of potentially very low cost. In addition, such sensors are capable of very fast response. Reference may be made to U.S. Pat. No. 4,478,076 issued Oct. 23, 1984 in the name of P. J. Bohrer, and publications cited therein, for a detailed description of the fabrication techniques, structure and performance characteristics of microbridge sensors.

Basic sensors of the above-described type are sensitive to mass air flow, which is a parameter of considerable importance in a number of applications, including combustion control systems, and particularly including the control of fuel-air mixtures in internal combustion engines in which it is necessary to determine the mass air flow into a mixing or combustion chamber.

One of the problems encountered in utilizing microbridge mass air flow sensors in automotive applications is the presence of particulate matter, oil droplets and other contaminants in the air flow. Microbridge sensors are, in some respects, inherently quite fragile, and are subject to impact damage. Even through the combustion air is filtered to remove particulate matter and other contaminants, the air flow past the sensor may, from time to time, have contaminants suspended therein. The air volume flow rate into an internal combustion engine is typically quite high, and may approach 1000 Kg/Hr. Contaminants carried in this air flow can destroy a microbridge sensor. Accordingly, precautions must be taken to prevent contaminants from impacting the sensor element.

Various techniques and probe designs have been devised in attempts to alleviate the foregoing problem. For example, the sensor element may be protected by its own dedicated filter, or the sensor element may be positioned or structure provided so that the element is located out of the main air stream.

These techniques and arrangements, though more or less effective in protecting the sensor element, introduce other problems. Filter type arrangements generally provide increased impedance to fluid flow, thus affecting a sensor's performance and generally decreasing its sensitivity to the total air mass passing the sensor location. Placing the sensor element out of the main air stream generally decreases its ability to sense the mass flow rate of interest.

SUMMARY OF THE INVENTION

The present invention is a flow sensor including a flow sensor element mounted in a probe body having a flow entrance opening and at least one flow exit opening connected by an arcuate passageway which effectively directs contaminants suspended in the fluid whose flow is being sensed away from a sampling port to which the flow sensor element is connected, and a corresponding method of protecting a fragile flow sensor element from impact damage from contaminants in a fluid whose flow is being sensed. The flow entrance opening is aligned with an axis from which the flow exit opening is offset. The passageway is partially defined by an outer wall generally characterized by a the first curvature and an inner wall generally characterized by a second curvature greater than the first curvature. The sampling port is located in the inner wall and may be connected to a second arcuate passageway having a second sampling port in its inner wall with a third passageway connected thereto in which the sensor element is located.

The method comprises the steps of forming at least one arcuate passageway connecting a flow entrance opening aligned with an axis and a flow exit opening offset from the axis and positioning a flow sensor element in a second passageway connected to a sampling port in the inner wall of the first passageway.

DESCRIPTION OF THE PREFERRED EMBODIMENTS

Figure 1:
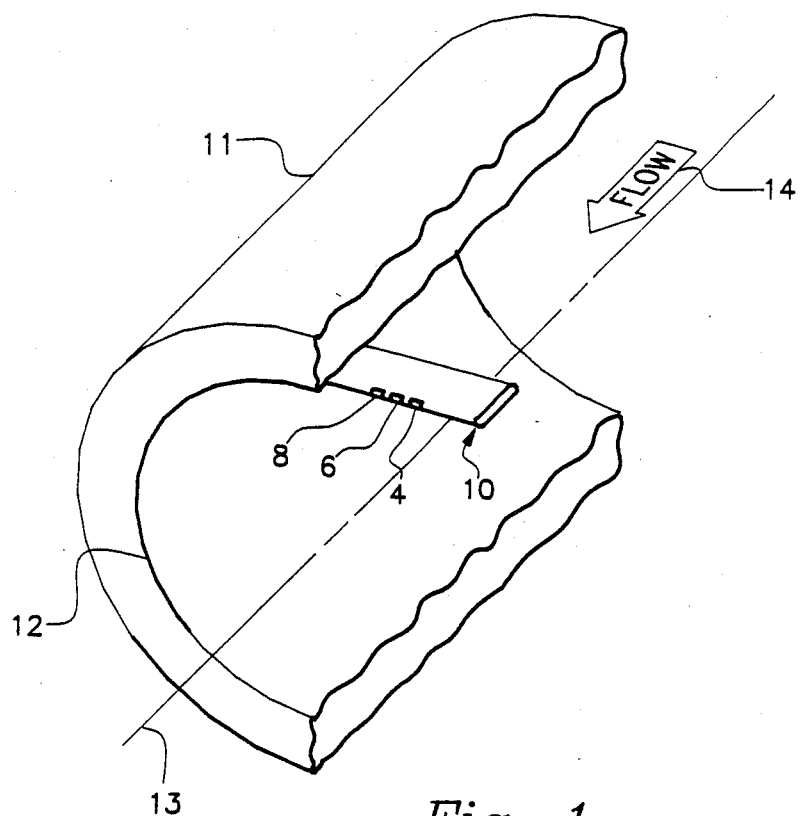
FIG. 1 is a perspective view of a flow sensor probe in accordance with the applicant's invention mounted in the bore of a tubular member shown partially broken away.

In FIG. 1, reference numeral 10 generally identifies a flow sensor probe in accordance with the applicant's invention mounted within a tubular member 11 having a bore or hole 12 therethrough centered on and extending along an axis 13. Bore 12 is adapted to accommodate a flow of fluid therethrough as indicated by arrow 14.

For purposes of facilitating a description of the invention, member 11 will be considered part of a carburetor or air intake for an internal combustion engine. Bore 12 may be considered as the throat of the carburetor or air intake. However, applicability of the applicant's flow sensor probe is not limited to automotive applications, but is suitable for a variety of applications in which it is desired to sense mass fluid flow.

As shown in FIG. 1, sensor probe 10 is in the form of a somewhat aerodynamically shaped strut extending from a wall of body 11. Reference numerals 4, 6 and 8 identify flow exit openings from various passageways within probe 10, as will be described in greater detail hereinafter. A flow entrance opening is located on the upstream edge of probe 10 and is not visible in FIG. 1.

Figure 2:
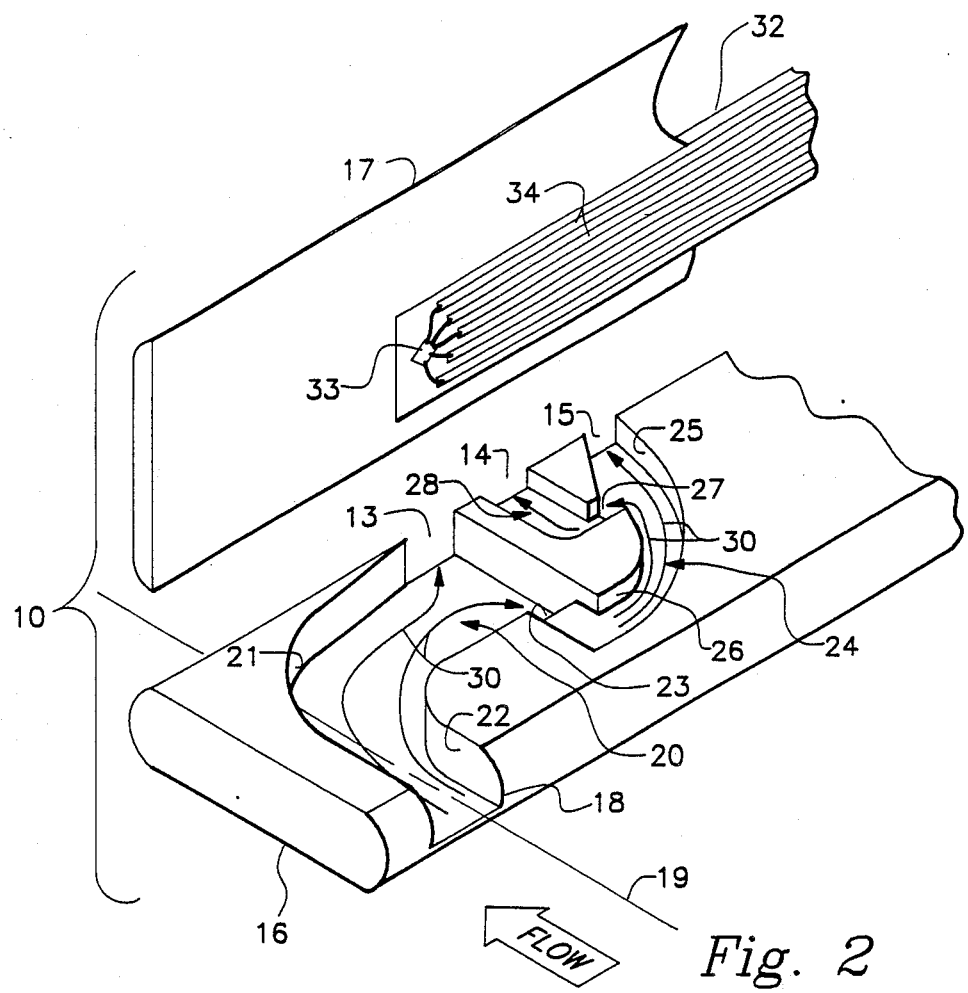
FIG. 2 is an exploded perspective view of the flow sensor probe shown in FIG. 1.

As shown in FIG. 2, probe 10 includes a body 16 and a cover 17. Reference numeral 18 identifies a flow entrance opening which is aligned with an axis 19 parallel with the direction of flow of fluid whose flow is to be sensed. A first arcuate passageway 20 connects fluid inlet opening 18 and fluid exit opening 4. Passageway 20 is partially bounded by a outer wall 21 generally characterized by a first curvature and an inner wall 22 generally characterized by a second curvature greater than a curvature of wall 21. Stated otherwise, outer wall 21 generally has a larger radius of curvature than inner wall 22.

Reference numeral 23 identifies a sampling port in inner wall 22 of passage 20. A second arcuate passageway 24 connects sampling port 23 with fluid exit opening 8. Passageway 24 is bounded in part by an outer wall 25 generally characterized by a third curvature and an inner wall 26 generally characterized by a fourth curvature greater than the curvature of wall 25.

Reference numeral 27 identifies a second sampling port in inner wall 26 of passageway 24. A third passageway 28 connects sampling port 27 to fluid exit opening 6.

Passageways 20, 24 and 28 generally lie in a plane containing axis 19. The depth of passageway 24 perpendicular to the plane is smaller than the depth of passageway 20 and the depth of passageway 28 perpendicular to the plane is smaller than the depth of passageway 24. Fluid entrance opening 18 and fluid exit openings 4–8 are sized such that the sum of the cross sectional areas of exit openings 4–8 equals the cross sectional area of fluid entrance opening 18.

Arrows 30 indicate the path of fluid through passageways 20, 24 and 28. The passageways are configured such that centrifugal forces acting on contaminants in the fluid whose flow is being sensed force the contaminants toward outer walls 21 and 25 and away from sampling ports 23 and 27. Thus, contaminants entering passageway 28 are minimized.

Cover 17 is formed with a channel therein for accommodating a ceramic substrate 32 having a sensor element 33 mounted on the inner end thereof in such a position that, with cover 17 in place, sensor element 33 is located in passageway 28. Substrate 32 also has formed thereon conductors 34 for carrying signals and power between element 33 and external utilization apparatus (not shown), which may be a fuel control system for an internal combustion engine.

Figure 3:
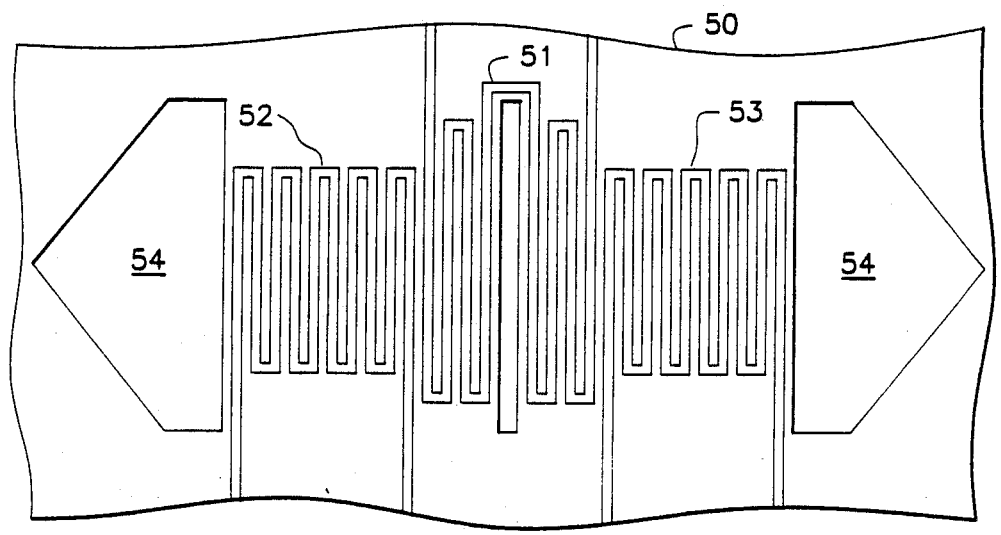
FIG. 3 is a plan view of a microbridge flow sensor element of the type suitable for use in the applicant's flow sensing probe.

A suitable embodiment of element 33 is shown in FIG. 3 in which reference numeral 50 identifies a portion of a silicon die having a pattern of thin film elements formed thereon. The thin film elements include a centrally located heater 51 and a pair of heat sensors 52 and 53 on opposite sides thereof After the thin film elements are formed on die 50, a depression 54 extending under heater 51 and heat sensors 52 and 53 is etched into the die, leaving the thin film elements suspended over the depression. Such a detector can be inexpensively mass produced using well known semiconductor fabrication techniques.

As apparent from the foregoing description, sensor element 33 is substantially protected from particles in the fluid whose flow is being sensed. A particle massive enough to damage the sensor element would most likely have sufficient centrifugal forces acting thereon to prevent it from entering sampling ports 23 and/or 27.

A specific embodiment of the applicant's invention has been shown and described for internal combustion engine control system applications. However, a variety of other modifications and features which do not depart from the applicant's contemplation and teaching will be apparent to those of ordinary skill in the relevant arts. It is not intended that coverage be limited to the disclosed embodiment, but only by the terms of the following claims.

The embodiments of the invention in which an exclusive property or right is claimed are defined as follows:

1. A flow sensor comprising:
    a probe body having a flow entrance opening aligned with an axis and a first flow exit opening offset from the axis, the exit opening being connected to the entrance opening by a first arcuate passageway partially bounded by an outer wall generally characterized by a first curvature and an inner wall generally characterized by a second curvature greater than the first curvature, said probe body further having a first sampling port in the inner wall of said first arcuate passageway; and
    detector means connected to the first sampling port, said detector means including a flow detector subject to impact damage from contaminants suspended in the fluid whose flow is to be sensed, the first arcuate passageway creating centrifugal force which tends to carry the contaminants away from the sampling port.

2. The flow sensor of claim 1 wherein:
    the detector means includes a second flow exit opening in said probe body connected to the first sampling port by a second arcuate passageway partially bounded by an outer wall generally characterized by a third curvature and an inner wall generally characterized by a fourth curvature greater than the third curvature the inner wall having a second sampling port therein; and
    said flow detector is located in a third passageway connected to the second sampling port.

3. The flow sensor of claim 2 wherein:
    said detector means includes a third flow exit opening in said probe body; and
    the third passageway connects the second sampling port and the third exit opening.

4. The flow sensor of claim 3 wherein the sum of the cross sectional areas of the first, second and third flow exit openings is substantially equal to the cross sectional area of the flow entrance opening.

5. The flow sensor of claim 4 wherein said flow detector is of the type having a thin film heater and at least one thin film heat sensor spaced from the thin film heater along the direction of flow.

6. The flow sensor of claim 4 wherein:
    the first, second and third passageways generally lie in a common plane containing the axis of the flow entrance opening;
    the depth of the second passageway perpendicular to the plane is smaller than the depth of the first passageway; and
    the depth of the third passageway perpendicular to the plane is smaller than the depth of the second passageway.

7. The flow sensor of claim 6 wherein the first, second and third exit openings lie in a second plane perpendicular to the axis of the flow entrance opening.

8. The flow sensor of claim 7 wherein said flow detector is of the type having a thin film heater and at least one thin film heat sensor spaced from the thin film heater along the direction of flow.

9. A method of protecting a fragile flow sensor from impact damage from contaminants suspended in a fluid whose flow is being sensed, comprising the steps of:
    forming a first arcuate passageway having a flow entrance opening and a first flow exit opening, the first arcuate passageway being partially bounded by an outer wall generally characterized b a first curvature and an inner wall generally characterized by a second curvature greater than the first curvature;

forming a second arcuate passageway connecting a first sampling port in the inner wall of the first passageway; and mounting the flow sensor in the second passageway.

10. The method of claim 9 wherein:

the second arcuate passageway is partially bounded by an outer wall generally characterized by a third curvature and a inner wall generally characterized by a fourth curvature greater than the third curvature;

a third passageway is connected to a second sampling port in the inner wall of the second passageway; and the flow detector is suspended in the third passageway.

11. The method of claim 10 wherein said flow detector is of the type having a thin film heater and at least one thin film heat sensor spaced from the thin film heater along the direction of flow.

12. The method of claim 11 wherein:

the first, second and third passageways having first, second and third exit openings respectively; and the sum of the cross sectional areas of the first, second and third exit openings is substantially equal to the cross sectional area of the flow entrance opening.

13. The method of claim 12 wherein:

the first, second and third passageways lie in a common plane containing the axis of the flow entrance opening;

the depth of the second passageway perpendicular to the plane is smaller than the depth of the first passageway; and the depth of the third passageway perpendicular to the plane is smaller than the depth of the second passageway.

* * * * *